US008042757B2

(12) United States Patent
Bender et al.

(10) Patent No.: US 8,042,757 B2
(45) Date of Patent: *Oct. 25, 2011

(54) WELDING WIRE GUIDE RING

(75) Inventors: Raymond Bender, Willoughby, OH (US); David Barton, Twinsburg, OH (US); Herbert Matthews, Willoughby, OH (US)

(73) Assignee: Lincoln Global, Inc., City of Industry, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/717,309

(22) Filed: Mar. 4, 2010

(65) Prior Publication Data

US 2010/0155523 A1  Jun. 24, 2010

Related U.S. Application Data

(63) Continuation of application No. 11/774,636, filed on Jul. 9, 2007, now Pat. No. 7,690,593.

(51) Int. Cl.
  *B65H 59/06* (2006.01)
  *B65H 49/08* (2006.01)
  *B65H 55/00* (2006.01)

(52) U.S. Cl. ..... 242/171; 242/172; 242/566; 242/588.3; 242/615.3; 242/129; 206/409

(58) Field of Classification Search .............. 242/170, 242/171, 172, 566, 588.3, 593, 615.3, 128, 242/129; 206/388, 409

See application file for complete search history.

(56) References Cited

U.S. PATENT DOCUMENTS

| | | | |
|---|---|---|---|
| 2,864,565 | A | 12/1958 | Whearley |
| 4,582,198 | A | 4/1986 | Ditton |
| 4,869,367 | A | 9/1989 | Kawasaki et al. |
| 5,105,943 | A | 4/1992 | Lesko et al. |
| 5,277,314 | A | 1/1994 | Cooper et al. |
| 5,494,160 | A | 2/1996 | Gelmetti |
| 5,819,934 | A | 10/1998 | Cooper |
| 5,845,862 | A | 12/1998 | Cipriani |
| 6,016,911 | A | 1/2000 | Chen |
| 6,019,303 | A | 2/2000 | Cooper |
| 6,237,768 | B1 | 5/2001 | Cipriani |
| 6,260,781 | B1 | 7/2001 | Cooper |
| 6,547,176 | B1 | 4/2003 | Blain |
| 6,564,943 | B2 | 5/2003 | Barton et al. |
| 6,636,776 | B1 | 10/2003 | Barton et al. |
| 6,648,141 | B2 | 11/2003 | Land |
| 6,649,870 | B1 | 11/2003 | Barton et al. |

(Continued)

FOREIGN PATENT DOCUMENTS

DE          10360466          7/2005

(Continued)

*Primary Examiner* — William E Dondero
(74) *Attorney, Agent, or Firm* — Kevin M. Dunn; Lou F. Wagner; Hahn Loeser & Parks

(57) ABSTRACT

A wire guiding device includes a base and a guide portion for streamlining the flow of coiled wire from a storage container. Side walls may be included to bridge the distance between the device and the storage container to prevent wire from rising upward around the outside of the wire guiding device. As the amount of wire in the bin decreases, the wire guiding device will float downward maintaining constant downward pressure on the coil of wire. Wire in the storage container will therefore be drawn out in a smooth manner limiting or substantially preventing tangles.

16 Claims, 5 Drawing Sheets

U.S. PATENT DOCUMENTS

| | | |
|---|---|---|
| 6,745,899 B1 | 6/2004 | Barton |
| 6,889,835 B2 | 5/2005 | Land |
| 6,913,145 B2 | 7/2005 | Barton et al. |
| 6,938,767 B2 | 9/2005 | Gelmetti |
| 6,977,357 B2 | 12/2005 | Hsu et al. |
| 7,004,318 B2 | 2/2006 | Barton |
| 7,178,755 B2 | 2/2007 | Hsu et al. |
| 7,198,152 B2 | 4/2007 | Barton et al. |
| 7,690,593 B2 * | 4/2010 | Bender et al. ............... 242/171 |
| 2003/0052030 A1 | 3/2003 | Gelmetti |
| 2005/0023392 A1 | 2/2005 | Hsu et al. |
| 2006/0278747 A1 | 12/2006 | Carroscia |
| 2007/0272573 A1 | 11/2007 | Gelmetti |
| 2009/0014572 A1 | 1/2009 | Weissbrod et al. |

FOREIGN PATENT DOCUMENTS

| | | |
|---|---|---|
| EP | 1295813 | 3/2003 |
| EP | 1698421 | 9/2006 |
| GB | 2332451 | 6/1999 |
| JP | 01 065265 | 4/1989 |
| JP | 04 112169 | 4/1992 |
| JP | 2007 000927 | 2/2007 |
| JP | 2007 029971 | 2/2007 |
| WO | 2005061168 | 7/2005 |

* cited by examiner

WELDING WIRE GUIDE RING

This application is a continuation patent application claiming priority to U.S. utility patent application Ser. No. 11/774,636 filed on Jul. 9, 2007, which is incorporated herein by reference in its entirety.

TECHNICAL FIELD

The present invention pertains to a wire guiding device for dispensing wire, and more particularly, to a welding wire guide ring used to dispense wire from a drum or container.

BACKGROUND OF THE INVENTION

Wire is frequently packaged and stored in drums for delivery to an end user. In particular, wire such as that used for welding or soldering, is wound in coils as it is placed in the drums. Once shipped to the end user, the wire is dispensed from the container for use in numerous processes. In many instances, the wire is left in the container and metered out as needed without removing the entire coil. Suppliers frequently incorporate a twist in the wire as it is fed into the drum, which helps the wire emerge without rotating as it is drawn back out.

However, dispensing wire from coils presents the problem of unwinding the wire uniformly without intertwining or forming knots, which can lead to defects or breaks in the wire resulting in costly downtime. The wire may tangle in any number of ways. For example, multiple loops of wire may be drawn from the top of the coil at the same time entangling the wire as it drawn from the drum. In other instances, loops of wire may unravel and fall behind the coil causing the wire to intertwine.

Solutions intent on obviating these problems have been previously implemented using a payout ring having an aperture for guiding the wire during the unwinding process. The ring is placed inside the container and on top of the coil. An end of the wire is fed through the aperture. The aperture in the payout ring is typically smaller than the inner diameter of the coiled wire bundle. When the wire is drawn from the coil, it contacts the payout ring around the edge of the aperture. However, the payout ring does not provide a gradual transition surface over which the wire may smoothly flow. Rather, the planar nature of the payout rings causes the wire to break over a relatively sharp edge as it drawn from the container.

What is needed is a device that allows coiled wire to be dispensed from a container without tangling and kinking. The embodiments of the subject invention obviate the aforementioned problems by providing a wire guiding device that limits or substantially prevents the wire from binding and tangling as it is drawn out of the container or drum.

BRIEF SUMMARY

In one embodiment of present invention, a wire guiding device includes a generally planar base portion having a centerline axis and an inner peripheral edge dimensioned to substantially cover the cross section of an associated coil of wire, and may further include a wire guide portion extending from the base portion in a first direction, the wire guide portion having a sloped surface terminating at a first end that defines an aperture through which associated wire may be dispensed, where the aperture is spaced axially apart from base portion with respect to the centerline axis or with respect a plane of the base portion.

In one aspect of the embodiments of the present invention, the diameter of the inner peripheral edge is smaller than the inner diameter of the cross section of the associated coiled wire.

In another aspect of the embodiments of the present invention, the wire guide portion defines a curved surface extending contiguously from the base portion to the aperture.

In yet another aspect of the embodiments of the present invention, the wire guide portion extends substantially around the entire circumference of the inner peripheral edge.

In still another aspect of the embodiments of the present invention, the aperture is spaced apart from a plane crossing through the inner peripheral edge by a distance D, wherein the distance D is substantially in the range from 1 to 5 inches and/or wherein the distance D is less the diameter of the wire guiding device.

In yet another aspect of the embodiments of the present invention, the base portion further includes one or more ribs extending radially outward from the centerline axis.

DETAILED DESCRIPTION OF THE INVENTION

Figure 1:
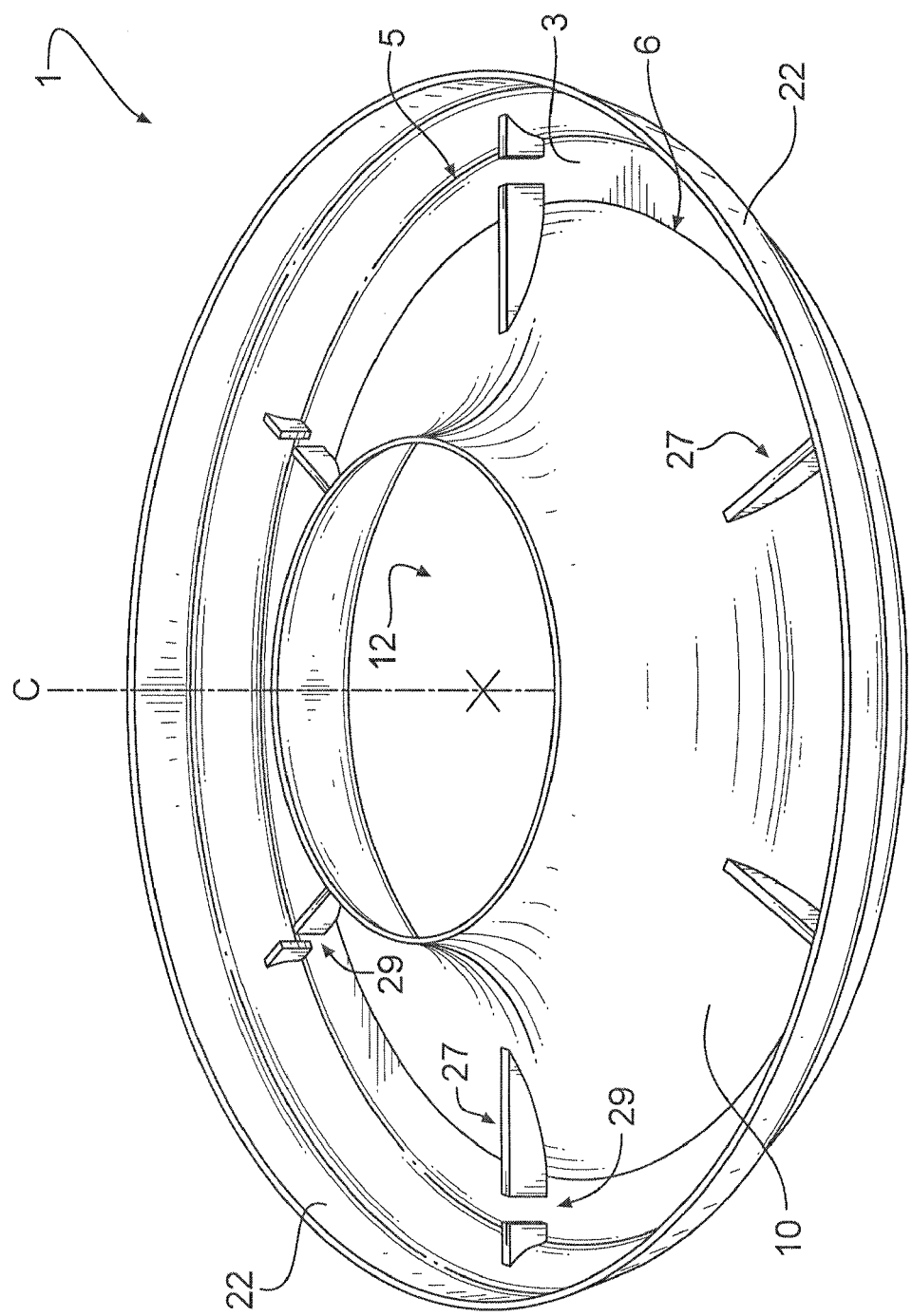
FIG. 1 is a perspective view of a wire guiding device according to the embodiments of the invention.

Referring now to the drawings wherein the showings are for purposes of illustrating embodiments of the invention only and not for purposes of limiting the same, FIG. 1 shows a wire guiding device depicted generally at 1. The wire guiding device 1 may include a generally planar bottom referred to as the base or base portion 3. The base portion 3 may have an annular configuration defining an outer peripheral edge 5. The base portion 3 may further include an inner peripheral edge 6 lying in close proximity to or substantially in the same plane as the outer peripheral edge 5. While the outer peripheral edge 5 of the base portion 3 is described herein as being circular in configuration, persons of ordinary skill in the art will readily understand the application of other geometric shapes to the embodiments of the present invention. The wire guiding device 1 may also include a guide portion or wire guide portion 10. The wire guide portion 10 may extend inward from the inner peripheral edge 6 of the base portion 3 toward a centerline axis C. In one embodiment, the wire guide portion 10 may further include a curved surface sloping upward in a first direction. The wire guide portion 10 may terminate at an aperture 12 having a center substantially coincident with the centerline axis C. However, it is contemplated in another embodiment that the center of the aperture 12 may be offset with respect to the centerline axis C. The aperture 12 may be circular in configuration having a characteristic plane parallel to, but spaced apart from, the plane of the base portion 3 by a distance D, which may be less than the diameter of the base portion 3. In one embodiment, the distance D may be in the range of 1 to 5 inches. However, any distance D may be chosen as is appropriate for use with the embodiments of the present invention. It is noted here that other embodiments are contemplated where the plane of the aperture 12 is inclined with respect to the plane of the base portion 3 in any direction and at any angle.

Figure 2:
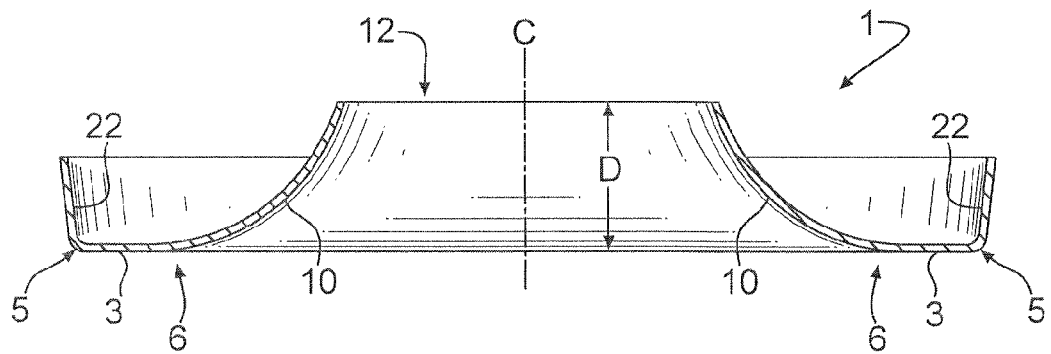
FIG. 2 is a cross section side view of a wire guiding device according to the embodiments of the invention.
Figure 3:
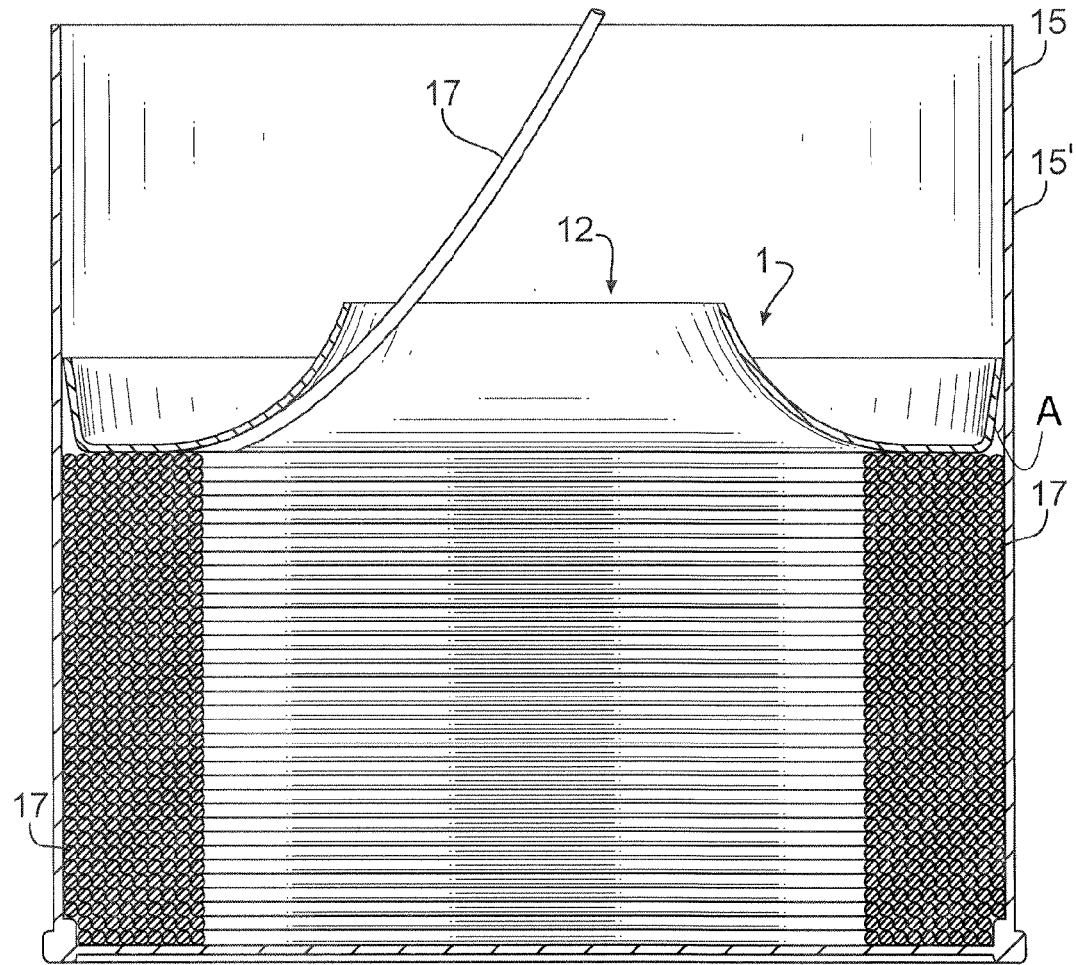
FIG. 3 is a cross section side view of a wire guiding device received within a drum or wire storage container according to the embodiments of the invention.

With continue reference to FIG. 1 and now also to FIGS. 2 and 3, the wire guiding device 1 may be received within a wire storage container 15, which in an exemplary manner may be a drum 15', used to store coiled wire for use in any type of application, and more particularly for welding applications. The wire guiding device 1 may have a cross section that corresponds to the circumference of the wire storage container 15, which in an exemplary manner may be generally circular. However, other embodiments are contemplated that incorporate other cross sectional configurations, like for example polygonal configurations. As such, wire 17 may be wound into the drum 15' in a coiled manner and stored therein for use at a later time. The coil of wire may have an inner and outer diameter. The outer diameter of the coiled wire 17 may be constrained by the circumference of the drum 15'. The inner diameter of the coiled wire may vary depending on the type of wire being wound in the drum 15'. It follows that a cross section of the coiled wire 17 has a characteristic width W, the surface of which may be substantially covered by the wire guiding device 1 during use as will be discussed further in a subsequent paragraph. Accordingly, the wire guiding device 1 may be subsequently placed into the wire storage container 15 on top of the coiled wire 17. It will be readily seen that as the height of the coiled wire 17 diminishes, the wire guiding device 1 may float downward within the drum 15' maintaining constant contact with the top surface of the coiled wire 17. Accordingly, the wire guiding device 1 may be constructed such that it freely descends downward despite any contact with the surfaces of the drum 15', as will be discussed in detail below.

With continued reference to FIGS. 1 through 3, the outer peripheral edge 5 of the base portion 3 may be sized to match the circumference of the drum 15'. By matching the circumference of the drum 15', it is meant that the diameter of the outer peripheral edge 5 may be equal to or somewhat less than the circumference of the drum 15'. The wire guiding device 1 may further include a side wall 22 extending from the outer peripheral edge 5. The side wall 22 may be fashioned at an angle A with respect to an axis perpendicular to the plane of the base portion 3 or a vertical axis. The angle A may range from 0° to 90°. More specifically the angle A may be in the range of 1° to 10°, and in particularly 5°. The length of the side wall 22 may extend outward far enough to contact the surface of the drum 15' thereby spanning the region between the base portion 3 and the surface of the drum 15'. As such any length of side wall 22 may be chosen as is appropriate for use with the embodiments of the present invention. By contacting the surface of the drum 15', the wire 17 may be prevented by rising upward around the wire guiding device 1 thus limiting or substantially preventing tangles from occurring in this manner. It is noted here that the side wall 22 may angle upward in the same direction as that of the wire guide portion 10. However, in another embodiment, it is contemplated that the side wall 22 may extend downward in the opposite direction. Accordingly, the side wall 22 may function to close the region between the base portion 3 and the wall of the drum 15'.

With continued reference to FIGS. 1 through 3, the wire guiding device 1 may be constructed from a semi-rigid or pliable material, such as a thermoplastic material. Examples of this kind of material may include but are not limited to: polystyrene or ABS (Acrylonitrile butadiene styrene), PVC, High Impact Polystyrene, High Density Polyethylene, Polyester, and Thermoplastic elastomers such as Acetal, Santoprene, and Hytrl. However, any material may be utilized that allows the wire guiding device 1 and more specifically, the side wall 22 to flex when contacting the wire storage container 15. By being pliable, the side wall 22 may deform to fill in gaps between the wire guiding device 1 and the drum 15', which may arise due to inconsistencies in constructing the drum 15'. Accordingly, the wire guiding device 1 may be constructed by thermoforming or plastic injection molding. Although, any manner of constructing the wire guiding device 1 may be chosen with sound engineering judgment. In this way, the wire guiding device 1 may be constructed as a unitary article contiguously formed substantially over the entire surface of the wire guiding device 1. Still, other embodiments may include individually constructed sections or pieces that are assembled and fastened together to form the wire guiding device 1.

With continued reference to FIG. 2, as noted above the base portion 3 may sit on top of the coiled wire 17 and may cover a substantial portion of the width W of the cross section of the coiled wire 17. More specifically, the inner peripheral edge 6 may have a diameter slightly less than the inner diameter of the coiled wire 17. In one embodiment, the diameter of the inner peripheral edge 6 may be between 0% and 5% smaller than the diameter of the coiled wire 17. As such, the base portion 3 may cover most or all of the surface area of the cross section of the coiled wire 17. The base portion 3 may be substantially flat and horizontal distributing the weight of the wire guiding device 1 evenly over the top surface of the coiled wire 17. The weight of the wire guiding device 1 may vary depending upon the type and/or size of wire that is being utilized. For example, typical welding wire 17 packaged in this fashion may range in diameter from 0.035 inches to 0.062 inches. Accordingly, the wire guiding device 1 may have a weight in the range from 0.5 pounds to 2.5 pounds. In one instance, for welding wire having a diameter of 0.035 inches, the wire guiding device 1 may have a weight of substantially 0.6 pounds. However, any proportion of the weight of the wire guiding device 1 to the type and/or size of welding wire 17 may be chosen as is appropriate for use with the embodiments of the present invention.

With reference again to FIG. 2, the inner peripheral edge 6 may be termed a transition region delineating between the base portion 3, which may be linear in configuration, and the wire guide portion 10, which may be curved. The two portions 3, 10 may be blended together at the transition region thereby providing a smooth transition surface against which the wire 17 may contact as it is being dispensed. In other words, the transition between the two regions 3, 10 may be seamless having no abrupt changers in the contour so as not to disrupt the flow of wire 17. In one embodiment, the radius of curvature of the wire guide portion 10 may be constant. In another embodiment, the radius of curvature may vary. In even another embodiment, the wire guide portion 10 may be substantially linear thereby composing a frusto-conical surface. Persons of ordinary skill in the art will recognize this as an infinite radius of curvature. However, it is to be construed that any radius of curvature or any contoured surface comprising the wire guide portion 10 may be chosen with sound judgment as is appropriate for use with the embodiments of the subject invention. It is noted here that any length of the curved surface and/or any diameter of the aperture 12 may be chosen without limiting the scope of coverage of the embodiments of the subject invention.

The wire guiding device 1 may further include one or more gussets or ribs 27. The ribs 27 may be fashioned on one side of the wire guiding device 1. More specifically, all of the ribs 27 may be fashioned on the opposite side of the wire guiding device 1 from which the wire 17 may contact its surface during use. The ribs 27 may extend longitudinally from the base portion 3 to the wire guiding portion 10 and may have any length as is appropriate for strengthening and/or for providing rigidity to the wire guiding device 1. In one embodiment, the ribs 27 may extend radially outward from the centerline axis C. Although, it is to be construed that any orientation of the ribs with respect to the centerline axis C may be utilized. Additionally, the ribs 27 may include one or more notches 29 fashioned therein, which may be used to locate a shipping core or shipping collar as will be discussed further in a subsequent paragraph. It is noted that any height of the ribs 27 may be chosen without limiting the scope of coverage of the embodiments of the subject invention. The wire guiding device 1 may be constructed with six (6) ribs 27. However, the wire guiding device 1 may be constructed with any number of ribs 27.

Figure 4:
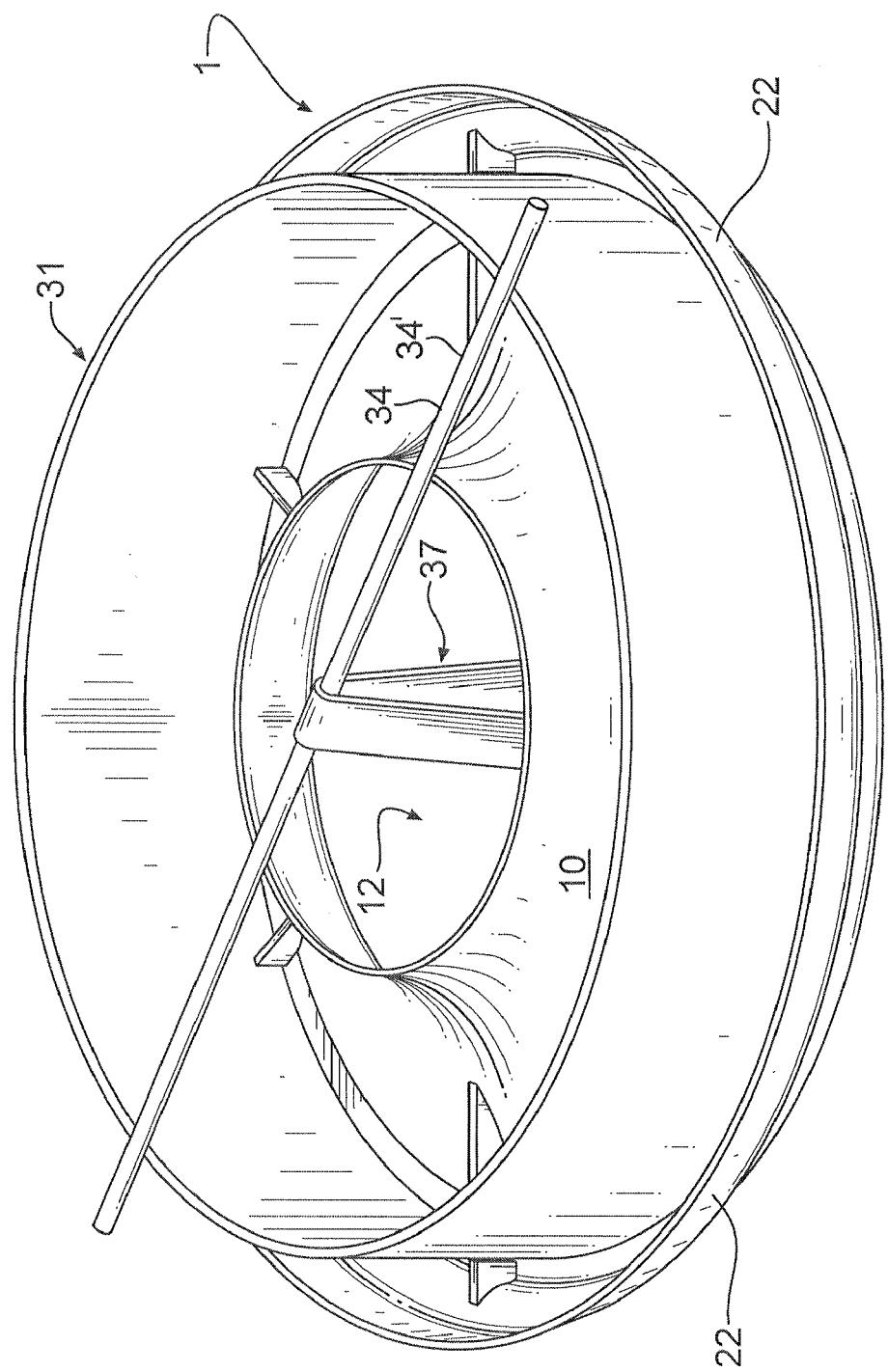
FIG. 4 is a perspective view of a wire guiding device and shipping core or shipping collar according to the embodiments of the invention.

With reference to FIG. 4, a shipping collar 31 may be included that sits on top of the wire guiding device 1. The shipping collar 31 may be comprised of a continuously formed ring constructed from a semi-rigid or rigid material. The diameter of the shipping collar 31 may correspond to the position of the notches 29 formed in the ribs 27 as mentioned above. In this manner, the notches 29 function as a locater for positioning the shipping collar 31. It is noted here that any width of the shipping collar 31 and the notches 29 may be chosen as is appropriate for use with the embodiments of the subject invention. The shipping collar 31 may be held in place by at least one cross member 34, which may be a cross bar 34'. One or more cross members 34 may span a diameter or chord of the shipping collar 31 and may be held in place by a band 37 fixedly connected to the drum 15'. In this way, the shipping collar 31 presses against the wire guiding device 1 during shipping of the wire to its destination thereby preventing unraveling of the wire 17. The band 37 and cross member 34 may then be removed before use. It is noted that the shipping collar 31 may or may not be removed from the wire guiding device 1. It will be readily seen that leaving the shipping collar 31 in place will add to the overall weight of the wire guiding device 1 increasing the force applied to the coil of wire 17, which may be desirable for heavier gauge wire 17.

Figure 3A:
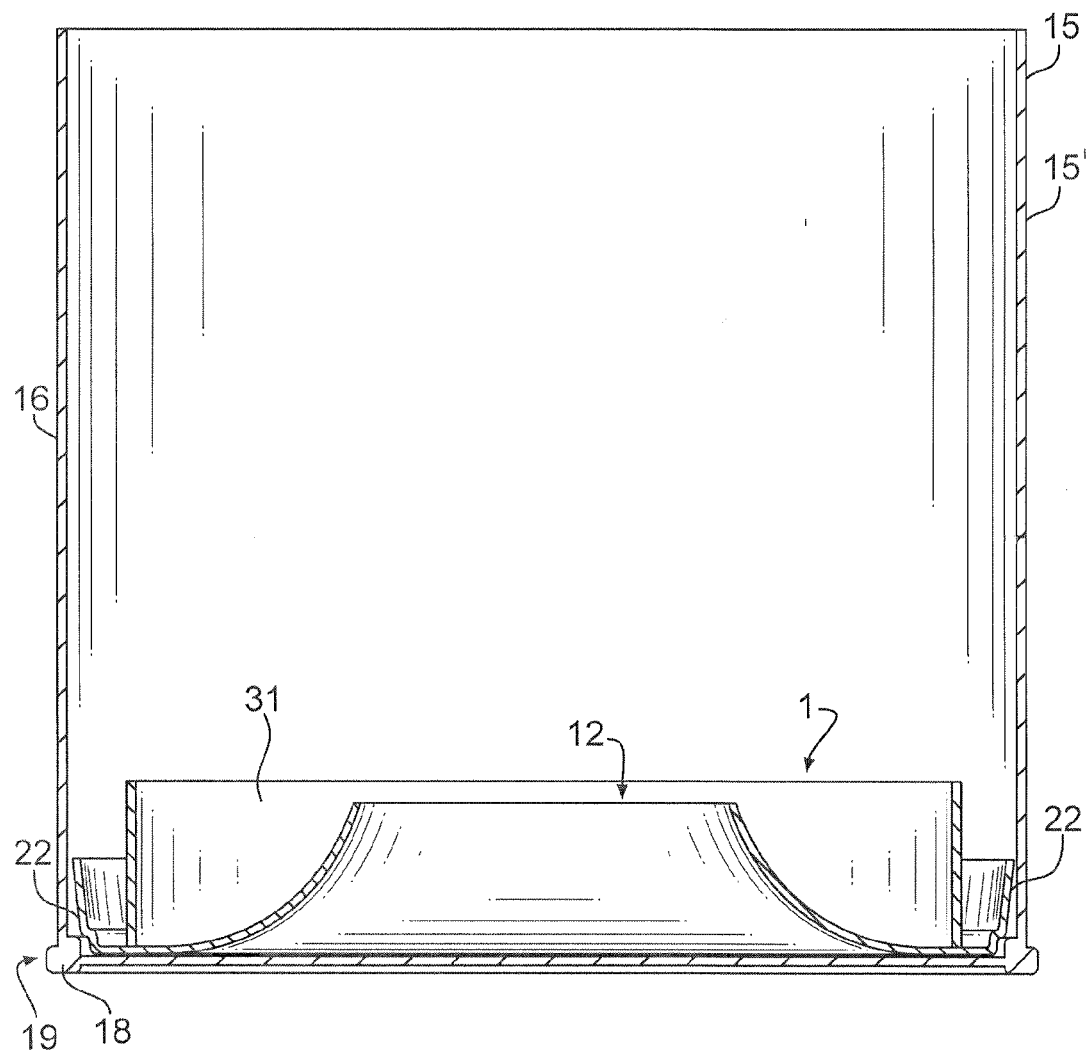
FIG. 3a is a cross section side view of a wire guiding device received within a drum or wire storage container according to the embodiments of the invention.
Figure 5:
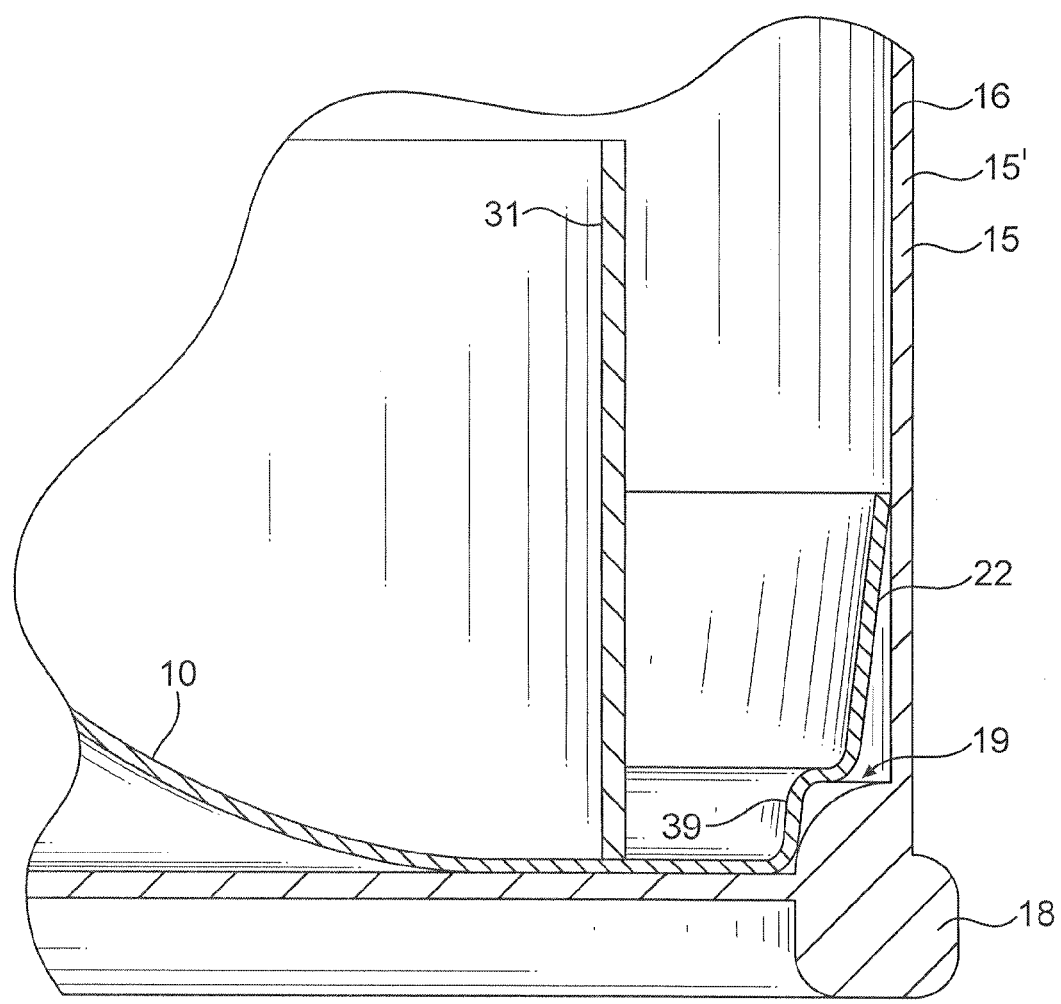
FIG. 5 is a cross section close up view of a wire guiding device according to the embodiments of the invention.

With reference now to FIGS. 3a and 5, the drum 15' may be assembled from multiple components including a cylindrical mid-section 16 and first and second end members 18. During the process of constructing the drum 15', a ledge referred to as a chime 19, may be fashioned at one or both ends of the drum 15'. To maintain contact between the wire guiding device 1 and the coiled wire 17 at all times, the wire guiding device 1 may include a step 39 formed between the base portion 3 and the side wall 22. The step 39 may correspond dimensionally to the chime 19. In this manner, as the height of the coiled wire 17 diminishes and the wire guiding device 1 approaches the bottom of the drum 15', the step 39 allows the base portion 3 to maintain constant contact with the coiled 17 through the full length of the drum 15'.

The invention has been described herein with reference to the preferred embodiment. Obviously, modifications and alterations will occur to others upon a reading and understanding of this specification. It is intended to include all such modifications and alternations in so far as they come within the scope of the appended claims or the equivalence thereof.

It is claimed:

1. A payout ring for dispensing wire from a coil stacked in an associated drum, the payout ring comprising:
   a generally planar base portion having an inner peripheral edge and an outer peripheral edge;
   an upwardly sloped wire guide portion extending from the inner peripheral edge of the base portion;
   a side wall extending from the outer peripheral edge of the base portion for restraining an associated wire from rising between the base portion and the associated drum; and
   one or more ribs extending radially from the base portion to the wire guide portion.

2. The payout ring as defined in claim 1, wherein the side wall is angled outward with respect to the base portion.

3. The payout ring as defined in claim 1, wherein the side wall forms an angle with respect to a vertical axis of the payout ring, and wherein the angle is in a range of 1° to 10°.

4. The payout ring as defined in claim 1, wherein the side wall forms an angle with respect to a vertical axis of the payout ring, and wherein the angle is substantially 5°.

5. The payout ring as defined in claim 1, wherein the side wall extends upward in a first direction.

6. The payout ring as defined in claim 1, wherein the side wall is constructed from a pliable material.

7. The payout ring as defined in claim 1, wherein the side wall and the base portion are formed as a unitary article.

8. The payout ring as defined in claim 1, wherein a diameter of the inner peripheral edge of the base portion is smaller than an inner diameter of a cross section of the coil.

9. A payout ring for dispensing welding wire from a coil stacked in an associated drum, the payout ring comprising:
   a generally planar base portion having an inner peripheral edge and an outer peripheral edge;
   an upwardly sloped wire guide portion extending from the inner peripheral edge of the base portion;
   one or more ribs extending from the base portion to the wire guide portion, wherein the one or more ribs are radially fashioned with respect to a centerline axis of the payout ring.

10. The payout ring as defined in claim 9, wherein at least one of the one or more ribs includes at least a first notch; and further comprising: a shipping core dimensioned to engage the at least first notch.

11. The payout ring as defined in claim 9, wherein a diameter of the inner peripheral edge of the base portion is less than an inner diameter of a cross section of the coil.

12. The payout ring as defined in claim 9, wherein the wire guide portion is curved, and a radius of curvature of the wire guide portion is constant.

13. The payout ring as defined in claim 9, wherein the wire guide portion is contiguously formed from the inner peripheral edge of the base portion.

14. The payout ring as defined in claim 9, wherein the base portion and the wire guide portion are formed as a unitary article.

15. The payout ring as defined in claim 9, wherein the base portion and the wire guide portion are constructed from a moldable polymer.

16. The payout ring as defined in claim 9, wherein a weight of the payout ring is in a range substantially between 0.5 and 2.5 pounds.

* * * * *